(12) United States Patent
Garibay et al.

(10) Patent No.: US 6,243,526 B1
(45) Date of Patent: Jun. 5, 2001

(54) STORAGE SPOOL ASSEMBLY FOR OPTICAL FIBER

(75) Inventors: Carlos Garibay, Indianapolis; Davis Louis Reed, New Palestine; William C. Ziegler, Cicero, all of IN (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/426,970

(22) Filed: Oct. 26, 1999

(51) Int. Cl.<sup>7</sup> ..................................................... G02B 6/00
(52) U.S. Cl. ............................................. 385/135; 385/137
(58) Field of Search ..................................... 385/134, 135, 385/136, 137

(56) References Cited

U.S. PATENT DOCUMENTS

| | | |
|---|---|---|
| 4,850,901 | 7/1989 | Smith et al. ........................... 439/676 |
| 5,041,018 | 8/1991 | Arnett ................................... 439/536 |
| 5,559,922 | 9/1996 | Arnett ................................... 385/135 |
| 5,638,481 * | 6/1997 | Arnett ................................... 385/135 |
| 5,761,368 | 6/1998 | Arnett et al. ......................... 385/134 |

\* cited by examiner

*Primary Examiner*—Cassandra Spyrou
*Assistant Examiner*—Euncha Cherry

(57) ABSTRACT

A preferred embodiment of the storage assembly includes a spool incorporating a first end, a second end, and a curved outer surface, with the outer surface being adapted for winding optical fibers thereon. A mounting arm extends from the spool, with an adapter engaging the distal end of the mounting arm. Preferably, the adapter has a receptacle formed therethrough, with the receptacle being adapted to receive and mount an optical fiber coupler therein. The assembly is configured to mount to a faceplate.

13 Claims, 6 Drawing Sheets

STORAGE SPOOL ASSEMBLY FOR OPTICAL FIBER

BACKGROUND OF THE INVENTION

1. Field of the Invention

The present invention generally relates to optical fibers and, in particular, to an assembly for mounting optical fiber couplers to faceplates and which accommodates the storage of excess optical fiber.

2. Description of the Related Art

Communications transmission media, such as optical fibers, typically are mounted to and terminated in output boxes, i.e., NEMA (National Electrical Manufacturers Associations) outlet boxes, for instance. Such outlet boxes generally are mounted to the rear of a wall and provide a receptacle, typically formed through a faceplate which is arranged at the front of the wall, for receiving a connector jack. So provided, one need only plug a connector jack into the receptacle of the faceplate in order to complete a communications connection with an optical fiber mounted within the outlet box. However, such a prior art arrangement typically does not provide a suitable amount of space within the outlet box for the storage of excess fiber and may tend to allow excess optical fibers stored within the outlet box to be damaged.

Optical fiber cables and, in particular, single buffered fibers encased within a protective outer jacket of such a cable, require extreme care in handling and in connecting, as well as in positioning and storing. Specifically, the fibers cannot be wound or bent to a radius less than a prescribed minimum bend radius without the occurrence of microcracks. Thus, it is important that some form of strain relief be used in routing the fibers. Further, it is desirable that the fiber be guided and supported to eliminate any loose fiber sags or loops that could possibly be inadvertently snagged or twisted, thereby increasing the risk of damage to the fibers.

In U.S. Pat. No. 5,761,368, issued to Arnett, et la., there is shown an optical fiber storage spool adapted to have excess optical fiber for wired links wound thereon. The storage spool disclosed therein incorporates a mounting arm which extends from a curved surface of the spool, with the mounting arm incorporating a mounting latch member at its distal end for securing the device to the receptacle of an optical fiber coupler. Typically, the optical fiber coupler is received within an adapter for mounting the coupler, and the attached adapter, within the receptacle of an outlet box faceplate. Thus, heretofore, it has been standard procedure to mount the adapter and coupler to the receptacle of the faceplate, and then to secure the spool assembly to the coupler. Once the adapter, coupler and spool assembly have been assembled, the optical fiber to be terminated is then mounted to the coupler by means of an optical fiber connector and any excess fiber is then wound about the spool of the spool assembly. During this procedure, extreme care must be exercised so that the adherence to the prescribed minimum bend radius requirements of the fiber being terminated is maintained.

Oftentimes, maintaining the minimum bend radius requirements of a fiber is exceedingly difficult due to the lack of space within the outlet box. Specifically, the lack of space makes it difficult for a technician to manipulate the fiber within the outlet box, such as while attempting to wind the fiber about the spool assembly mounted therein.

Therefore, there is a need for improved optical fiber mounting and storage devices which address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention generally is directed to a storage assembly for storing optical fibers. Typically, such optical fibers are adapted to be terminated with a connector, with each connector being adapted to engage a coupler. In a preferred embodiment, the storage assembly includes a spool incorporating a first end, a second end, and a curved outer surface, with the outer surface being adapted for winding the optical fibers thereon. A mounting arm extends from the spool, with an adapter engaging the distal end of the mounting arm. Preferably, the adapter has a coupler-receptacle formed therethrough, with the receptacle being adapted to receive and mount an optical fiber coupler therein. So configured, the spool assembly is conveniently configured for facilitating engagement of the connectors of the optical fibers to the coupler, prior to the spool assembly being mounted to the faceplate of the outlet box.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

Figure 1:
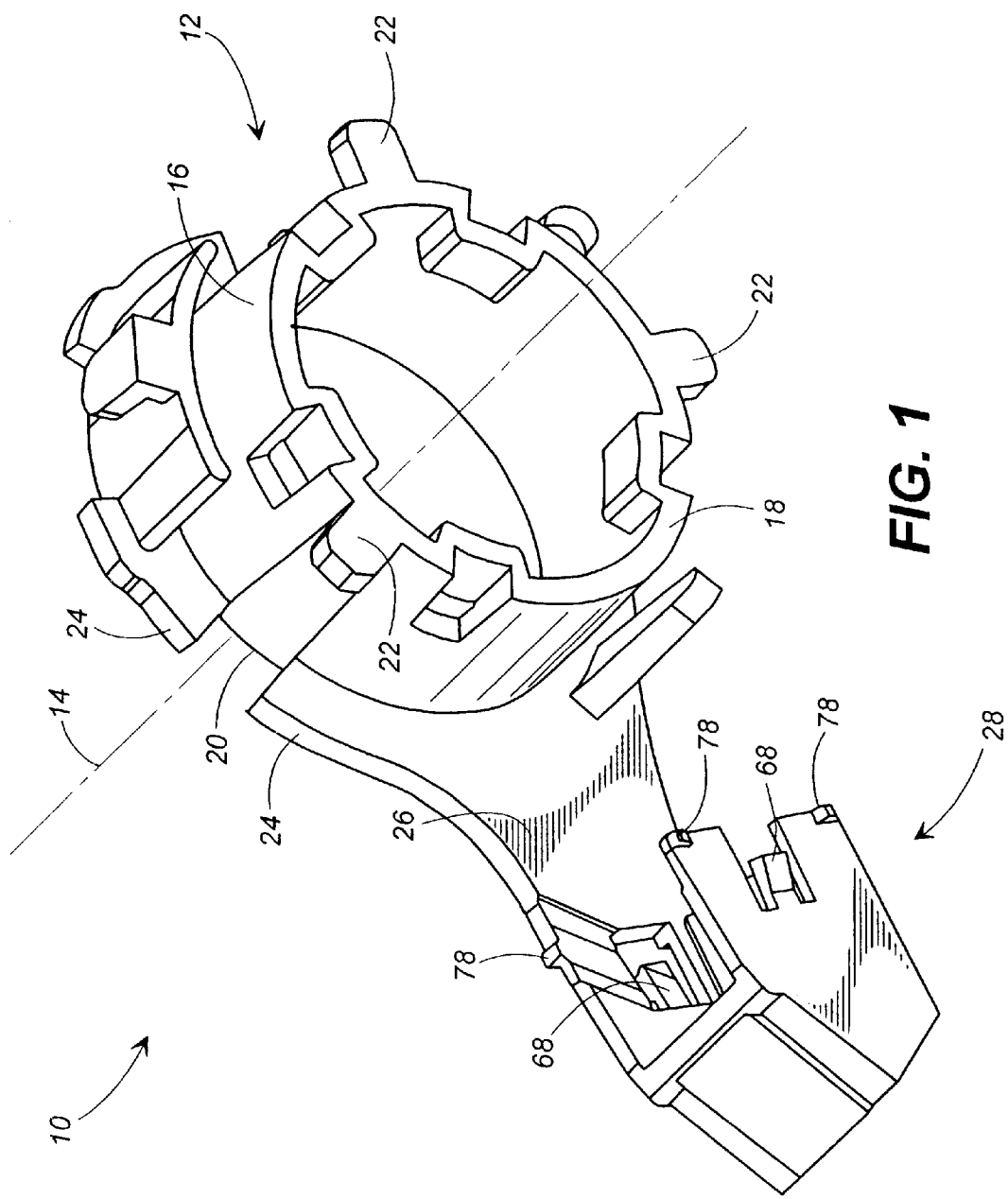
FIG. 1 is a perspective view of a preferred embodiment of the present invention.
Figure 2:
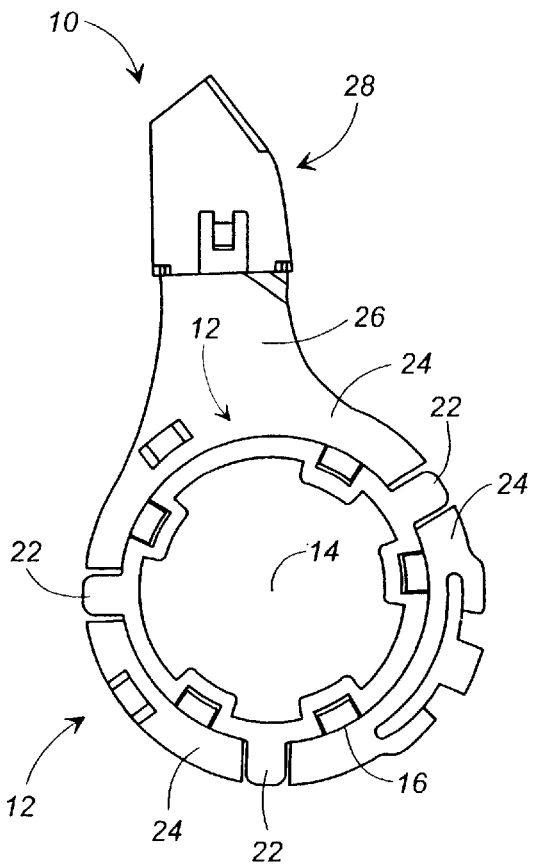
FIG. 2 is a left side elevational view of the embodiment depicted in FIG. 1.
Figure 3:
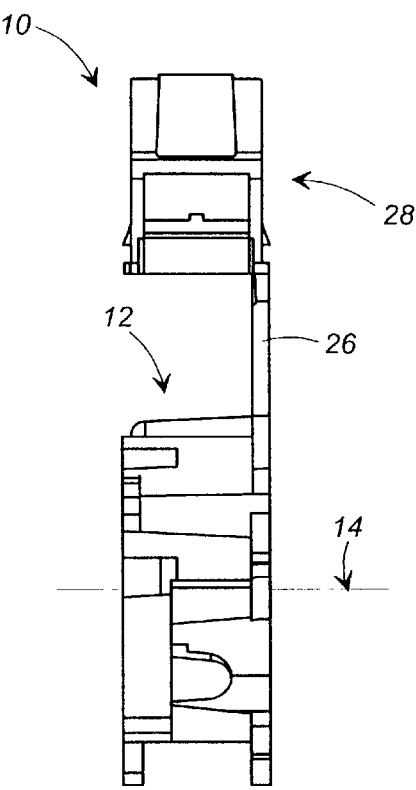
FIG. 3 is an end elevational view of the embodiment depicted in FIGS. 1 and 2.
Figure 4:
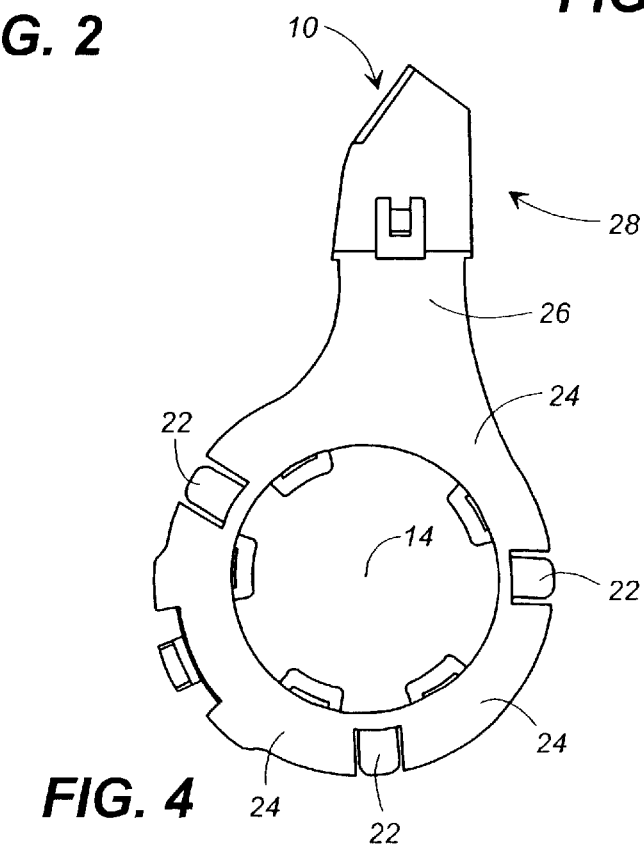
FIG. 4 is a right side elevational view of the embodiment depicted in FIGS. 1–3.

Reference will now be made in detail to the description of the invention as illustrated in the drawings, wherein like reference numbers indicate like parts throughout the several views. As shown in FIGS. 1–4, a preferred embodiment of the storage spool assembly 10 of the present invention incorporates a storage spool 12. Preferably, spool 12 is made of a suitable material such as a polycarbonate—ABS blend, for example, and is formed as a cylindrical member having a longitudinal axis 14 and an outer surface 16. Outer surface 16 is configured with a radius of curvature that is adapted for ensuring that optical fibers wound thereon will comply with a minimum bend radius of the optical fibers. Additionally, spool 12 includes a first end 18 and a second end 20, with the first end including a plurality of angularly-spaced, radially projecting retaining tabs 22. The tabs 22 perform the primary function of preventing fibers wound on the spool from slipping off of the first end of the spool.

Extending about a portion of the second end 20 is a plurality of angularly-spaced, radially projecting retaining wall segments 24 which serve a function similar to that served by the retaining tabs 22, i.e., preventing fibers wound on the spool from slipping off of the second end of the spool. A mounting arm 26, preferably integrally formed with one of the wall segments 24, extends radially outwardly from the spool 12 and serves to interconnect the spool 12 with an adapter 28. As described in greater detail hereinafter, the adapter 28 is configured for receiving an optical fiber coupler and also is configured for mounting the storage spool assembly 10 within a receptacle of a faceplate.

Figure 5:
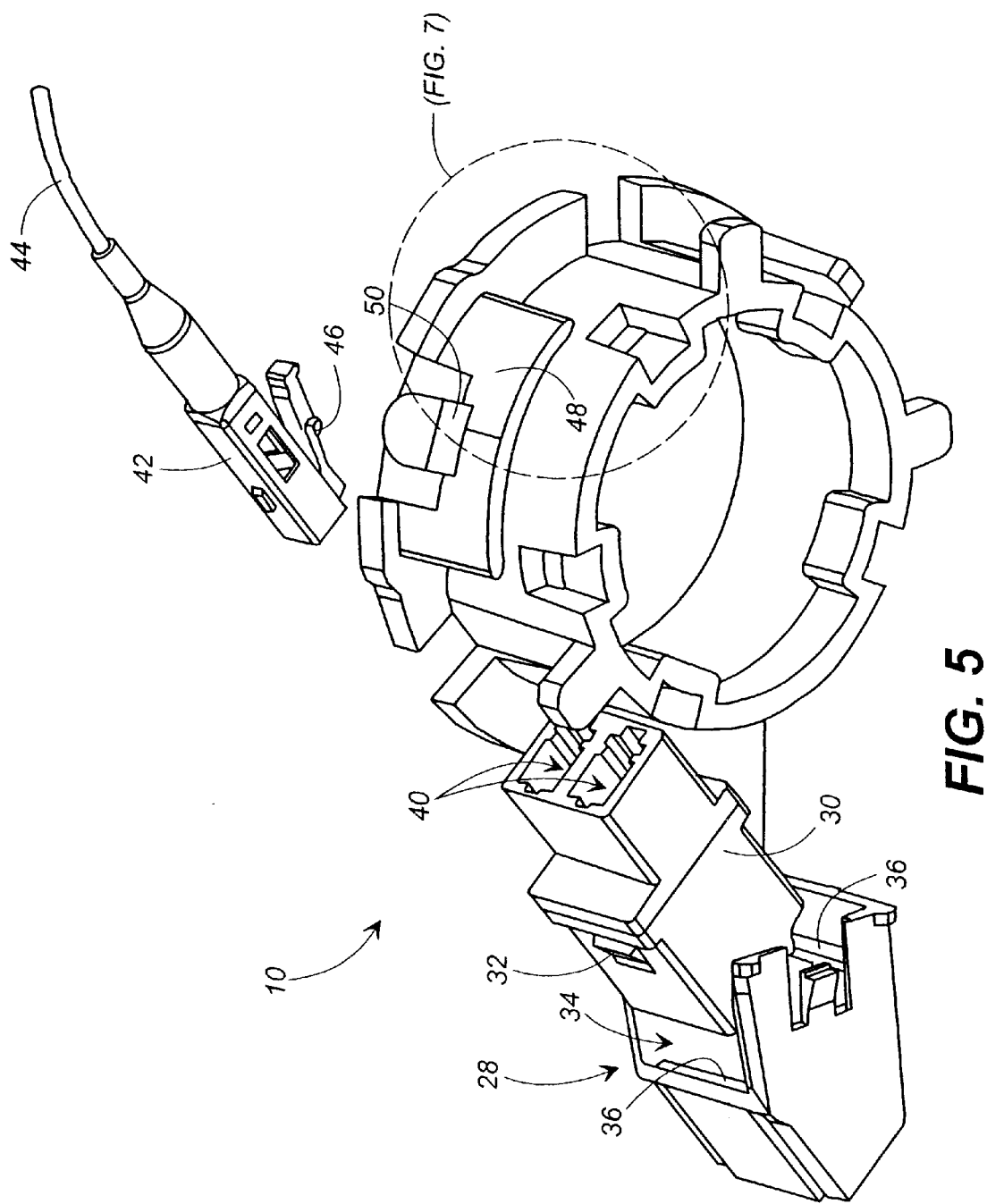
FIG. 5 is a partially exploded perspective view of a preferred embodiment of the present invention showing mounting detail of a representative optical fiber coupler and optical fiber connector.
Figure 6:
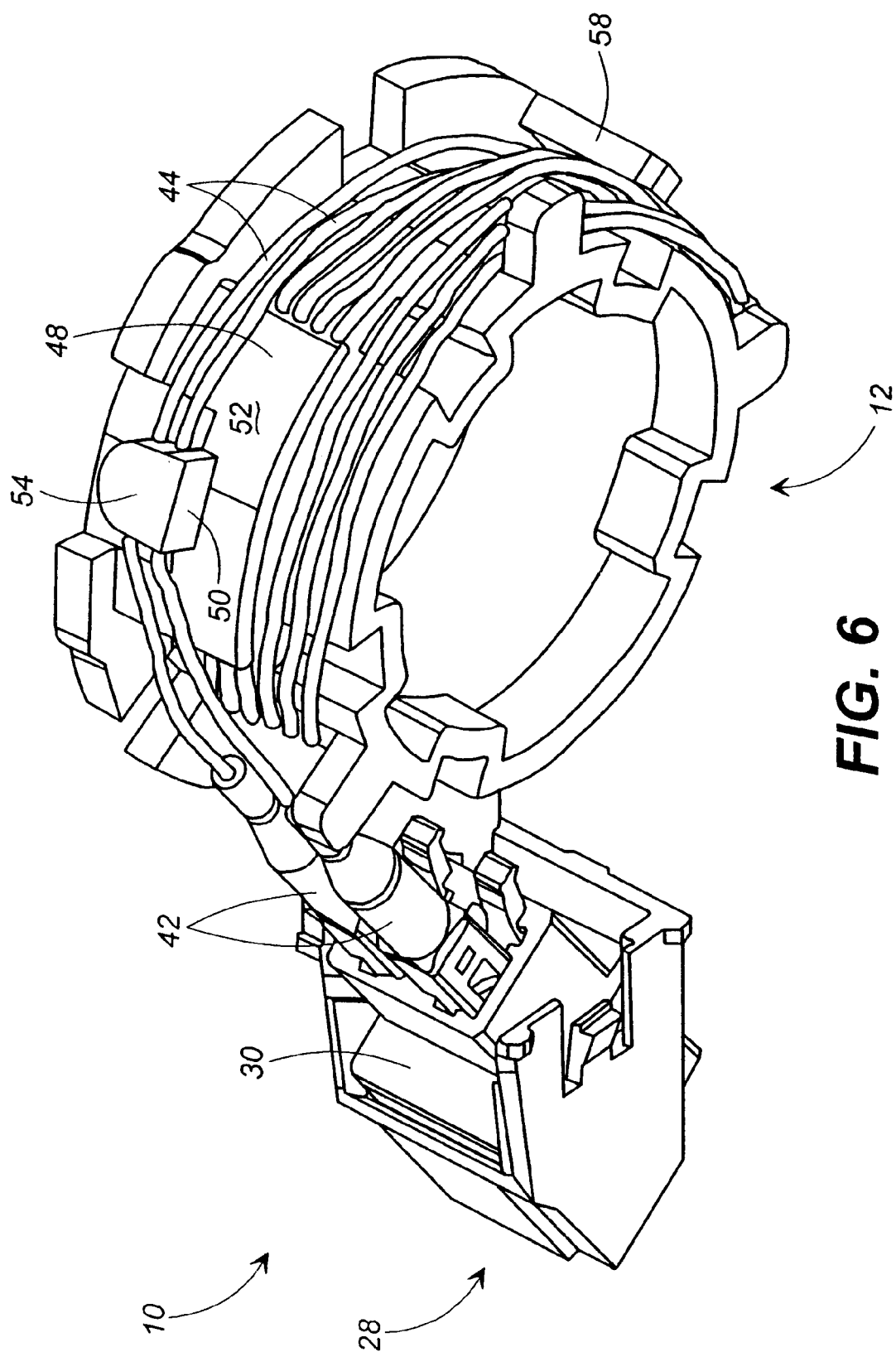
FIG. 6 is a perspective view of the embodiment depicted in FIG. 5 showing detail of representative connectors cooperating with the spool assembly and having their respective fibers wound thereabout.

Referring now to FIGS. 5 and 6, a preferred embodiment of the storage spool assembly 10 incorporates an adapter 28 which is configured for receiving a dual LC coupler 30. As depicted in FIG. 5, coupler 30 incorporates a pair of opposing latch tabs 32 (one of which is shown), which may be inwardly biased for allowing the coupler to be inserted within the coupler-receptacle 34 of the adapter 28. Once inserted within the coupler-receptacle 34, each of the latch tabs 32 engage a corresponding protrusion 36 which extends inwardly from an interior side wall of the adapter. After the latch tabs 32 have engaged their complementary protrusions 36, further movement of the coupler within the coupler-receptacle 34 urges the latch tabs 32 to deflect inwardly, thereby allowing the coupler to seat within the coupler-receptacle 34. After passing its corresponding protrusion 36, each latch tab returns to its pre-deflected position, thereby securing the coupler 30 within the coupler-receptacle 34 of the adapter. Additionally, each coupler 30 provides opposing pairs of connector-receiving receptacles 40, with each of the connector receiving receptacles being adapted for receiving an LC connector 42, for instance.

As shown in FIG. 6, connectors 42 may be engaged within respective connector-receiving receptacles 40 of a coupler 30, such as by inserting a connector within the receptacle and engaging respective latches 46 of the connector within the receptacle to ensure a proper engagement. The optical fibers 44 extending from the connectors 42 then may be wound about the spool 12, thereby ensuring that the minimum bend radius of the fibers is maintained.

In the embodiment depicted in FIGS. 1–6, the wall segment 24 closest to the mounting arm 26 includes a guide 48 which preferably is formed as an arcuate segment that extends at least partially across and is spaced radially from the outer surface 16 of the spool. The guide 48 also ensures that the minimum bend radius of the fibers is maintained. Preferably, a guide post 50 extends radially outwardly from an upper surface 52 of the guide and includes a cap member 54 at a distal end thereof that cooperates with the upper surface 52 of the guide to form a means for retaining the optical fibers 44 close to or on the upper surface of the guide.

Thus, the fibers extending outwardly from the connectors 42 preferably are first positioned across the upper surface of the guide and then are wrapped in clockwise fashion (as viewed in FIG. 6) about the outer surface 16 of the spool. One or more fingers 58 also may be provided which extend across at least a portion of the outer surface 16 and which are spaced radially therefrom for maintaining the fibers on or close to the outer surface 16. Therefore, in embodiments of the storage spool assembly 10 incorporating fingers 58, optical fibers 44 are wound between the outer surface 16 and the various fingers 58, thereby minimizing the formation of any loops of the optical fibers.

Figure 7:
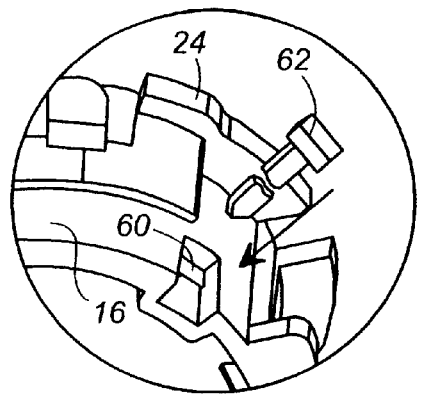
FIG. 7 is a partially cut-away perspective view of a preferred embodiment of the present invention showing detail of fastening a cable tie to the spool assembly.
Figure 8:
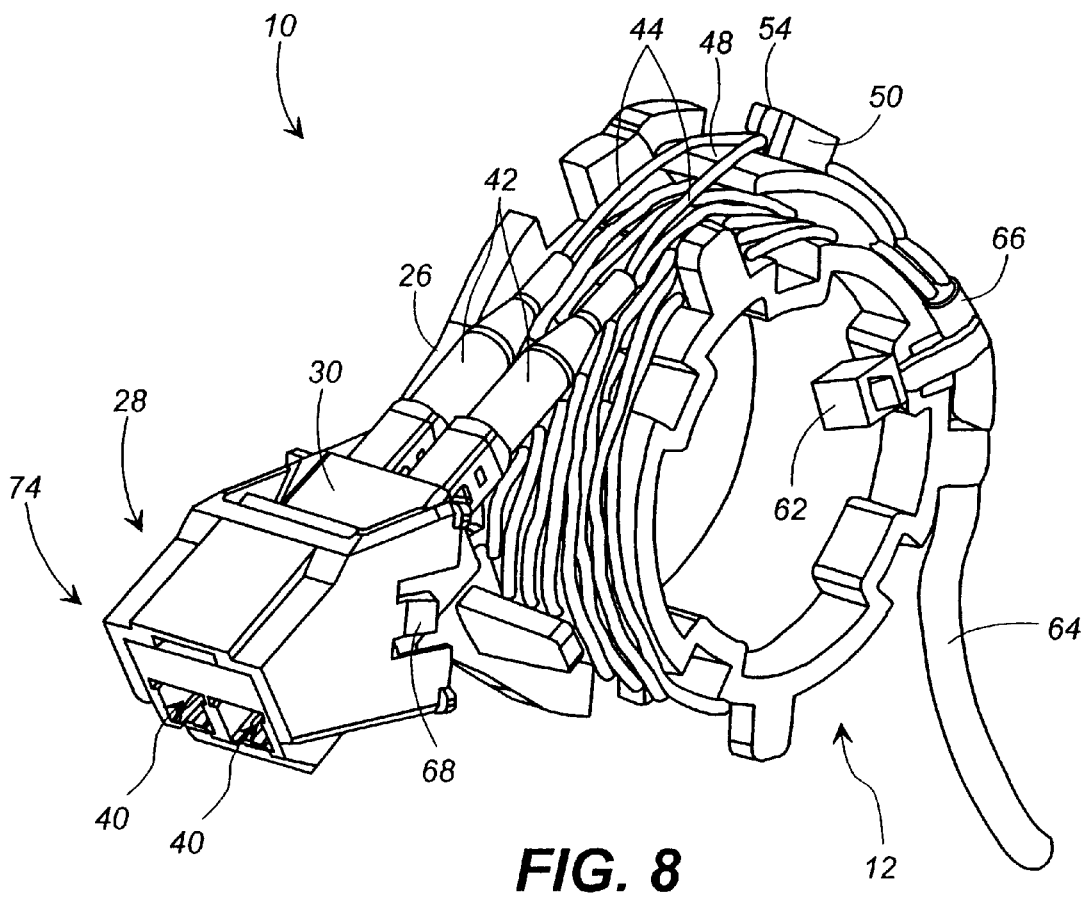
FIG. 8 is a perspective view of the embodiment depicted in FIGS. 5–7 showing detail of a representative cable tie attached to the spool assembly.

As depicted in FIG. 7, preferred embodiments of the storage spool assembly 10 may incorporate cable tie holes 60 which are angularly spaced about the first end of the spool and which are adapted to receive cable ties 62 for securing the position of an optical fiber cable jacket 64 (shown in FIG. 8). Preferably, a plurality of cable tie holes 60 are provided at various locations about the spool so that the cable jacket 64 may be secured to the assembly 10 regardless of the position of the terminated end 66 of the cable jacket.

It should be appreciated that the aforementioned steps associated with assembling the storage spool assembly 10, the coupler 30, and the connectors 42, with fibers wound about the spool 12, such as depicted in FIG. 8, has been accomplished without the storage spool assembly being mounted to the faceplate of an outlet box. Thus, the storage spool assembly 10 of the present invention provides a significant improvement over prior art storage spools, in that manipulation of optical fibers within the confines of an outlet box, which has heretofore been standard practice, is avoided.

Figure 9:
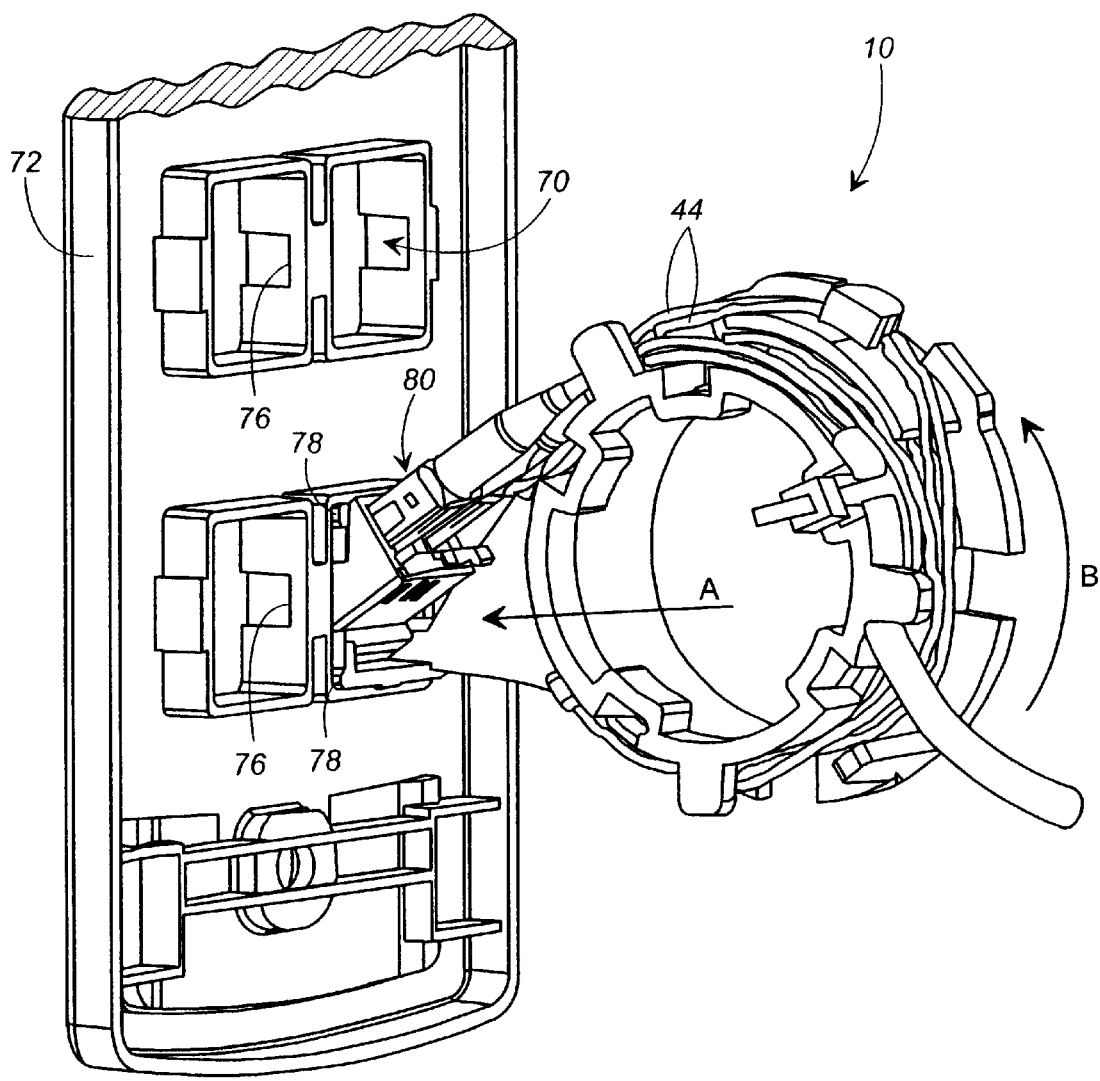
FIG. 9 is a partially cut-away perspective view of a preferred embodiment of the present invention shown mounted within the receptacle of a representative faceplate.

Referring now to FIGS. 8 and 9, preferred embodiments of the storage spool 10 incorporate a pair of opposing cantilevered latch tabs 68 (one of which is shown) which extend from the adapter 28. Latch tabs 68 are resilient tabs which may be inwardly biased to facilitate attachment and mounting of the adapter 28 within the receptacle 70 of an outlet box faceplate 72 (FIG. 9). As shown in greater detail in FIG. 9, mounting of the storage spool assembly 10 within the receptacle 70 is accomplished by inserting distal end 74 within the receptacle 70 and then moving the assembly in direction A and simultaneously rotating the assembly in direction B so that the latch tabs 68 engage corresponding latching surfaces 76 (one of which is shown in FIG. 9). Additionally, a series of stops 78 preferably protrude from the proximal end 80 of the adapter 28, thereby ensuring proper seating of the adapter 28 within the receptacle 70. So configured, not only are the fibers 44 protected by being behind the faceplate 72 and mounted within the outlet box to which the faceplate is mounted, the minimum bend radius of the fibers is ensured as the fibers are secured about the spool 12 of the storage spool assembly 10.

In preferred embodiments of the present invention, the storage spool assemblies 10 may be appropriately sized and shaped so that multiple ones of the assemblies may be arranged in a side-by-side configuration, such as depicted in FIG. 9, for instance, where the assemblies are mounted in side-by-side pairs to the faceplate 72 depicted.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A storage assembly adapted for mounting to a faceplate of an outlet box and for storing optical fibers, each of the optical fibers being adapted to be terminated with a connector, each connector being adapted to engage a coupler, said storage assembly comprising:

a spool having a first end, a second end, and a curved outer surface, said outer surface being adapted for winding the optical fibers thereon;

a mounting arm extending from said spool, said mounting arm having a proximal end engaging said spool and a distal end; and an adapter engaging said distal end of said mounting arm, said adapter having a coupler-receptacle formed therethrough, said coupler-receptacle being adapted to receive and mount the coupler therein, said adapter being configured to engage within a receptacle of the faceplate such that said spool assembly is mountable thereto.

2. The storage assembly of claim 1, wherein said spool is a substantially cylindrical member having a longitudinal axis, and said mounting arm extends radially from said spool.

3. The storage assembly of claim 1, wherein the optical fibers have a minimum bend radius and said outer surface has a radius of curvature at least as long as the minimum bend radius.

4. The storage assembly of claim 2, wherein said first end of said spool has a plurality of angularly-spaced, radially-projecting tabs extending therefrom, said tabs being adapted to prevent the optical fibers wound upon said outer surface of said spool from departing said spool at said first end.

5. The storage assembly of claim 2, wherein said second end of said spool has a plurality of angularly-spaced, radially-projecting wall segments extending therefrom, said wall segments being adapted to prevent the optical fibers wound upon said outer surface of said spool from departing said spool at said second end.

6. The storage assembly of claim 2, wherein the optical fibers extend from a cable jacket, and wherein said first end of said spool has a plurality of angularly-spaced cable tie holes formed therethrough, each of said cable tie holes being adapted to receive a cable tie therethrough such that the cable jacket is securable to said first end of said spool by inserting a cable tie through one of said cable tie holes, wrapping the cable tie about the cable jacket, and securely fastening the cable tie.

7. The storage assembly of claim 2, wherein said adapter has a first side wall, a second side wall, and a latch tab formed on each of said side walls, each of said latch tabs being formed as cantilevered members and being adapted for engaging an interior surface of the faceplate for securing said storage assembly to the faceplate.

8. The storage assembly of claim 5, wherein said mounting arm engages one of said wall segments.

9. The storage assembly of claim 5, wherein at least one of said wall segments has a guide member extending therefrom, said guide member having an upper surface adapted for winding the optical fibers thereon and a lower surface, said guide member being radially spaced from and at least partially overlying said outer surface of said spool such that said lower surface of said guide member, said outer surface of said spool, and said at least one of said wall segments form a channel for winding the optical fibers therethrough.

10. The storage assembly of claim 7, wherein said adapter has a proximal end and a distal end, said proximal end having a plurality of protrusions extending therefrom, said protrusions being configured to engage the faceplate such that, when the adapter is inserted within the receptacle of the faceplate, the protrusions properly align the adapter relative to the faceplate.

11. The storage assembly of claim 9, wherein said guide member has a first side edge and a second side edge, said second side edge engaging said at least one wall segment, said first side edge having a guide post extending outwardly therefrom at said upper surface thereof, said guide post being adapted to prevent the optical fibers wound upon said upper surface of said guide member from departing said guide member at said first side edge.

12. The storage assembly of claim 11, wherein said guide post has a distal end and a cap member extending from said distal end, said cap member being radially spaced from and at least partially overlying said upper surface of said guide member such that said cap member, said guide post, and said upper surface of said guide member form a retainer for retaining the optical fibers upon said upper surface of said guide member.

13. The storage assembly of claim 2, wherein the optical fibers extend from a cable jacket, and further comprising means for fastening the cable jacket to said spool.

* * * * *